3,784,693
Patented Jan. 8, 1974

3,784,693
3-SUBSTITUTED PHENYL-QUINAZOLINE-4(3H)-ONES AS SEDATIVE HYPNOTICS

Dietmar A. Habeck, Heidelberg, Germany, and William J. Houlihan, Mountain Lakes, N.J., assignors to Sandoz-Wander, Inc., Hanover, N.J.
No Drawing. Continuation-in-part of application Ser. No. 78,164, Oct. 5, 1970, which is a continuation-in-part of application Ser. No. 16,603, Mar. 4, 1970, both now abandoned. This application Oct. 18, 1972, Ser. No. 298,603
Int. Cl. A61k 27/00
U.S. Cl. 424—250    5 Claims

ABSTRACT OF THE DISCLOSURE 2-alkoxy and substituted alkoxy-3-substituted phenyl-quinazoline-4(3H)-ones, e.g., 2-ethoxy-3-(o-tolyl)-quinazoline-4(3H)-one are useful as central nervous system depressants.

---

This application is a continuation-in-part of copending U.S. Pat. application Ser. No. 78,164, filed Oct. 5, 1970 which in turn is a continuation-in-part of then pending application Ser. No. 16,603, filed Mar. 4, 1970, both now abandoned.

This invention relates to derivatives of 3-substituted phenyl-quinazoline-4(3H)-ones and their use as central nervous system depressants. In particular, the invention relates to alkoxy and substituted alkoxy derivatives of 3-substituted phenyl-quinazoline-4(3H)-ones and their use as sedative hypnotics.

The compounds of this invention may be represented by the formula

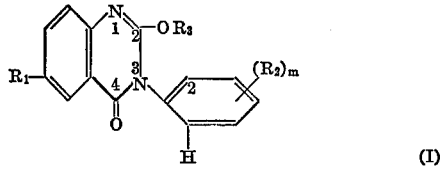

(I)

where $m$ is 1 or 2, $R_1$ represents hydrogen or halo having an atomic weight of about 19 to 36, each $R_2$ independently represents halo having an atomic weight of about 19 to 36; straight chain lower alkyl having 1 to 4 carbon atoms, e.g., methyl, ethyl, propyl, and the like; or straight chain lower alkoxy having 1 to 4 carbon atoms, e.g., methoxy, ethoxy, propoxy and the like, and $R_3$ represents straight chain lower alkyl having 1 to 4 carbon atoms, $-(CH_2)_n-CH_2OR_4$ or

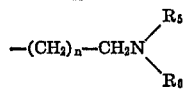

where $n$ is 1, 2 or 3, $R_4$ represents hydrogen, or lower alkyl having 1 or 2 carbon atoms, and $R_5$ and $R_6$ independently represent lower alkyl having 1 to 3 carbon atoms, e.g., methyl, ethyl, and the like;

and pharmaceutically acceptable acid addition salts of the compounds in which $R_1$ is

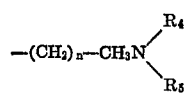

Preferred compounds of Formula I are those wherein $R_2$ or, when $m$ is 2, one of the $R_2$'s is ortho-methyl, i.e., methyl substituted on the 2 carbon of the 3-phenyl ring. Of special importance also are the compounds of Formula I in which $R_3$ is $-(CH_2)_n-CH_2OR_4$ because of their increased solubility in aqueous mediums. Likewise, the compounds of Formula I wherein "$R_3$" is

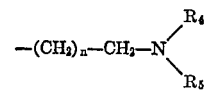

are interesting because they form pharmaceutically acceptable acid addition salts, which are also soluble in aqueous mediums.

The compounds of Formula I may be prepared in accordance with the following flow diagram:

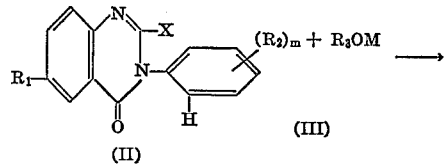

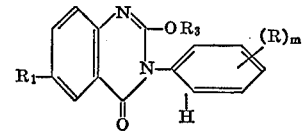

where

X is halo having an atomic weight of about 35 to 80 or cyano;
M is an alkali metal; and
$m$, $R_1$, $R_2$ and $R_3$ are as defined above.

The compounds of Formula I are prepared by treating a compound of Formula II with a compound of Formula III in an inert solvent. The compound of Formula III is prepared by conventional methods by treating the alcohol $R_1OH$ with an alkali metal or alkali metal hydride. Although the nature of M is not critical, sodium or potassium is the preferred alkali metal. The inert solvents which can be used include the hydrocarbon solvents, especially pentane, hexane, heptane, benzene, toluene, etc.; inert polar solvents, especially dimethyl formamide, tetrahydrofuran, etc.; or mixture of these solvents. The particular solvent used is not critical but a mixture of benzene and dimethyl formamide is preferred. Although the temperature is not critical, it is preferred that the reaction be carried out at temperatures of between 40° to 150° C., especially at the reflux temperature of the system. For optimum results, it is also preferred that the reaction be run for a minimum of 5 hours. The final product (I) is recovered by conventional techniques, e.g., chromatography.

Certain of the compounds of Formula I may also be prepared in accordance with the following flow diagram:

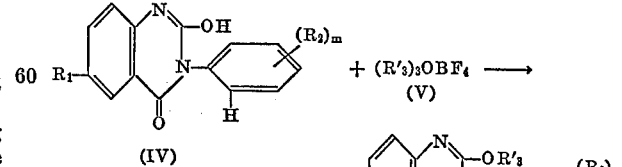

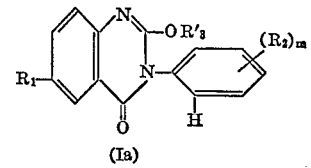

where $R'_3$ is lower alkyl having 1 or 2 carbon atoms; and
$m$, $R_1$ and $R_2$ are as defined above.

The products (Ia) are prepared by treating a 2-hydroxy-3-substituted phenyl-quinazoline-4(3H)-one (IV) with trimethyl or triethyloxonium tetrafluoroborate (V) in an inert solvent. Although the temperature is not critical, it is preferred that the reaction be run at a temperature between about 20° C. to 85° C., especially at the reflux temperature of the system. The particular solvent used is not critical but the chlorinated hydrocarbons, especially methylene dichloride and chloroform are preferred. For optimum results, it is desirable for the reaction to be run for about 1 to 4 hours. The final product is recovered by conventional techniques, e.g., precipitation and recrystallization.

Alternatively, certain compounds of Formula I are prepared in accordance with the following process:

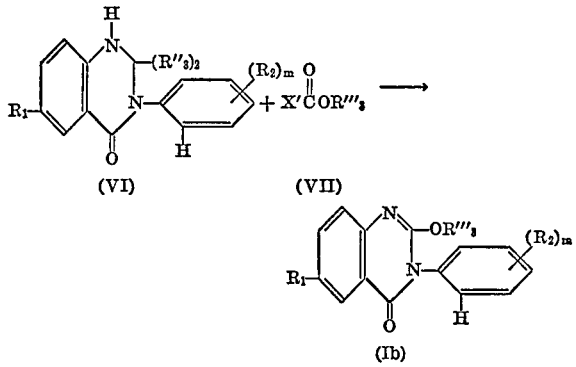

where

X' is halo having an atomic weight of about 35 to 80;
$m$, $R_1$ and $R_2$ are as defined above;
$R''_3$ and $R'''_3$ are straight chain lower alkyl having 1 to 4 carbon atoms; and
each $R''_3$ and $R'''_3$ can be the same or different.

The product (Ib) is prepared by treating 2,2-dialkyl-3-substituted phenyl-quinazoline-4(3H)-one (VI) with an excess of straight chain lower alkyl haloformate (VII) preferably, the chloroformate, in a solvent which is inert under the reaction conditions, preferably acetonitrile. An excess of base, e.g., potassium carbonate, is added to remove the hydrogen halide formed during the reaction. Although the temperature is not critical, it is preferred that the reaction be carried out at temperatures between about 60° to 120° C., preferably at the reflux temperature of the system. The reactants are refluxed for about 1 to 4 days for optimum results and the product is recovered by conventional techniques, e.g., chromatography.

The compounds of Formula IV may also be represented by their tautomeric equivalent formula

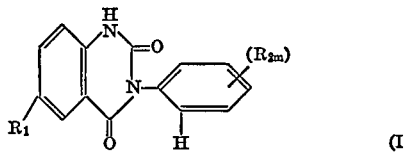

where $m$, $R_1$ and $R_2$ are as defined above.

For the sake of simplicity, however, Formula IV is used throughout the disclosure and is understood to include the tautomeric form (IVa).

The compounds of Formulas III, V and VII and certain of the compounds of Formula II, IV and VI are known and may be prepared by methods described in the literature. The compounds of Formulas II, IV and VI not specifically described in the literature may be prepared by analogous methods from known materials. For example, the compounds of Formula II are conveniently prepared from the 2-mercapto derivatives by treatment with inorganic acid halides, such as sulfonyl chloride.

The compounds of Formula I are useful because they possess pharmacological activity in animals, such as mammals. In particular, the compounds are useful as central nervous system depressants, especially as sedative hypnotics as indicated by their activity in mice tested according to the 30-word adjective check sheet system basically as described by Irwin, S. (Gordon Research Conference, Medicinal Chemistry 1959) and Chen (Symposium on Sedative and Hypnotic Drugs, Williams and Wilkins, 1954), or by the method of Orloff, et al. (Proc. Soc. Exp. Biol., 70:254, 1949) using mice in which convulsive seizures are chemically induced with strychnine and metrazol, or by the hexobarbital reinduction method of Winter (J. Pharmacol & Exp. Therap., 97:7, 1948).

For such usage, the compounds may be administered orally or parenterally as such or admixed with conventional pharmaceutical carriers. They may be administered in such forms as tablets, dispersible powders, granules, capsules, syrups and elixirs and parenterally as solutions, suspensions, dispersions, emulsions and the like, e.g. a sterile injectable aqueous solution. The compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay distintegration and absorption in the gastrointestinal tract and thereby provide a sustained action over a longer period. Similarly, oral liquids, e.g., suspensions may contain the active ingredients in admixture with any of the conventional excipients utilized for the preparation of such compositions, e.g., suspending agents, (methylcellulose, tragacanth and sodium aliginate) wetting agents (lecithin, polyoxyethylene stearate and polyoxyethylene sorbitan monoleate) and preservatives (ethyl-o-hydroxybenzoate). Capsules may contain the active ingredient alone or admixed with an inert solid diluent, e.g., calcium carbonate, calcium phosphate and kaolin. The injectable compositions are formulated as known in the art. These pharmaceutical preparations may contain up to about 90% of the active ingredient in combination with the carrier or adjuvant.

As indicated previously, the compounds of Formula I wherein "$R_3$" is

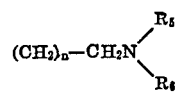

may be similarly administered in the form of their non-toxic pharmaceutically acceptable acid addition salts. Such salts possess the same order of activity as the free base, are readily prepared by reacting the base with an appropriate acid, and, accordingly, are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate, maleate, malate, tartrate, methanesulfonate, cyclohexylsulfamate and the like.

The sedative hypnotic effective dose of the compounds of Formula I will vary depending upon the mode of administration utilized and the particular compound employed. However, in general, satisfactory results are obtained when the compounds are administered at a daily dosage of from about 2 milligrams to 200 milligrams per kilogram of animal body weight. This daily dosage is preferably given in divided doses, e.g., 2 to 4 times a day, or in sustained release form. For most large mammals, the total daily dosage is from about 150 to 750 milligrams and, dosage forms suitable for internal administration comprise from about 37.5 milligrams to about 375 milligrams of the compound in admixture with a solid or liquid pharmaceutical carrier or diluent.

EXAMPLE 1

2-propoxy-3-(o-tolyl)-quinazoline-4(3H)-one

To 0.425 g. of sodium hydride prepared by washing 0.85 g. of 50% sodium hydride suspended in mineral oil with small amounts of pentane is added 20 ml. of benzene. To this slurry, 1 g. of n-propanol in 50 ml. of dimethyl formamide is added dropwise to form sodium propoxide. When the hydrogen gas ceases to evolve, 3 g. of 2-chloro-3-(o-tolyl)-quinazoline-4(3H)-one dissolved in 40 ml. of 1:1 mixture of dimethylformamide and benzene is added; and the resulting mixture is refluxed for 6 hours. The solvent is then evaporated off, and the product, 2-propoxy-3-(o-tolyl)-quinazoline-4(3H)-one (B.P. 170° C. at 0.5 mm.) is obtained by chromatography.

When ethylene glycol, or N,N-dimethyl-ethanolamine is used in place of n-propanol in the above process, there is obtained 2-(2-hydroxyethoxy)-3-(o-tolyl)-quinazoline-4(3H)-one (M.P. 92° C.); or 2-(2-dimethylamino-ethoxy)-3-(o-tolyl)-quinazoline-4(3H)-one (B.P. 155° C. at 10 mm.).

When equivalent amounts of 2-chloro-3-(3-chloro-o-tolyl)-quinazoline-4(3H)-one and ethanol or 2-chloro-3-(4-chloro-o-tolyl)-quinazoline-4(3H)-one and ethanol are used in place of 2-chloro-3-(o-tolyl)-quinazoline-4(3H)-one and n-propanol in the process of this example, there is obtained 2 - ethoxy - 3-(3-chloro-o-tolyl)-quinazoline-4-(3H)-one (M.P. 95° S.) or 2-ethoxy-3-(4-chloro-o-tolyl)-quinazoline-4(3H)-one (M.P. 95° C.), respectively.

EXAMPLE 2

2-ethoxy-3-(o-tolyl)quinazoline-4(3H)-one

Into a flask equipped with reflux condenser are charged 10 g. of 2-hydroxy-3-(o-tolyl)quinazoline-4(3H)-one dissolved in 100 ml. of methylene dichloride and an excess of triethyloxonium tetrafluoroborate. The reactants are refluxed for 4 hours after which the solution is washed with aqueous sodium carbonate. The solvent is removed by filtration and the residue distilled under high vacuum. Recrystallization from methyl alcohol yields 2-ethoxy-3-(o-tolyl)quinazoline-4(3H)-one (M.P. 67° C.).

When 6 - chloro - 2-hydroxy-3-(o-tolyl)-quinazoline-4-(3H)-one, 2-hydroxy-3-(4-chloro-o-tolyl) - quinazoline-4(3H)-one or 2-hydroxy-3-(4-chloro-o-tolyl)-quinazoline-4(3H)-one or 2-hydroxy-3-(4-methoxy-o-tolyl)-quinazoline-4(3H)-one is used in place of 2-hydroxy-3-(o-tolyl)-quinazoline-4(3H)-one in the process of this example, there is obtained 6-chloro-2-ethoxy-3-(o-tolyl)-quinazoline-4(3H)-one; 2-ethoxy-3-(4-fluoro-o-tolyl)-quinazoline-4(3H)-one, 2 - ethoxy - 3-(4-chloro-o-tolyl)-quinazoline-4(3H)-one or 2-ethoxy-3-(4-methoxy-o-tolyl)-quinazoline-4-(3H)-one, respectively.

EXAMPLE 3

2-methoxy-3-(o-tolyl)-quinazoline-4(3H)-one

In 50 ml. of acetonitrile in a flask equipped with a reflux condenser is dissolved 2,2-dimethyl-3-(o-tolyl)-quinazoline-4(3H)-one, and excess methyl chloroformate and excess potassium carbonate are added. The mixture is refluxed for 2 days after which the product 2-methoxy-3-(o-tolyl)-quinazoline-4(3H)-one (M.P. 180° C.) is recovered by chromatographing on a silica column using 1:1 chloroform/benzene as eluant.

When 6-chloro-2,2-dimethyl-3 - (o - tolyl)quinazoline-4(3H)-one, 2,2-dimethyl-3-(4 - fluoro-o-tolyl)quinazoline-4(3H)-one, 2,2-dimethyl-3-(4-chloro-o-tolyl)-quinazoline-4(3H)-one or 2,2-dimethyl-3-(4-methoxy-o - tolyl)quinazoline-4(3H)-one is used in place of 2,2-dimethyl-3-(o-tolyl)-quinazoline-4(3H)-one in the above process, and an equivalent amount of ethyl chloroformate is used in place of the methyl chloroformate, there is obtained 6-chloro-2-ethoxy-3-(o-tolyl)-quinazoline - 4(3H) - one, 2-ethoxy-3-(4 - fluoro-o-tolyl)quinazoline - 4(3H) - one, 2-ethoxy-3-(4-chloro-o-tolyl)-quinazoline 4(3H)-one or 2-ethoxy - 3 - (4-methoxy-o-tolyl)-quinazoline-4(3H)-one, respectively.

EXAMPLE 4

2-ethoxy-3-(4-methoxy-o-tolyl)-quinazoline-4(3H)-one

Following the procedure of Example 1, but using an equivalent amount of 2-cyano-3-(4-methoxy - o - tolyl)-quinazoline-4(3H)-one and ethanol in place of the 2-chloro-3-(o-tolyl)-quinazoline-4(3H)-one and n-propanol used therein, there is obtained 2-ethoxy-3-(4-methoxy-o-tolyl)-quinazoline-4(3H)-one.

When the procedure of Example 1 is carried out using equivalent amount of 2,6-dichloro - 3 - (o-tolyl)-quinazoline-4(3H)-one and ethanol, 2-chloro-3-(o-tolyl)-quinazoline-4(3H)-one and 2-methoxy-ethanol, 2,6-dichloro-3-(o-tolyl)-quinazoline 4(3H)-one and glycol or 2-chloro-3-(4-fluoro-o-tolyl)-quinazoline-5(3H)-one and ethanol in place of the 2-chloro-3-(o-tolyl)-quinazoline-4(3H)-one and n-propanol used therein, there is obtained 6-chloro-2-ethoxy-3-(o-tolyl)-quinazoline-4(3H)-one, 2-(2-methoxyethoxy)-3-(o-tolyl)-quinazoline-4(3H)-one, 6-chloro - 2 - (2-hydroxyethoxy)-3-(o-tolyl)-quinazoline-4(3H) - one, or 2-ethoxy-3-(4-fluoro-o - tolyl) - quinazoline - 4(3H) - one, respectively.

EXAMPLES 5 and 6

Tablets and capsules suitable for oral administration

Tablets and capsules containing the ingredients indicated below may be prepared by conventional techniques and are useful in treating tension at a dose of one tablet or capsule 2 to 4 times a day.

| Ingredient: | Weight (mg.) | |
| --- | --- | --- |
|  | Tablet | Capsule |
| 2-ethoxy-3-(o-tolyl)-quinazoline-4(3H)-one | 200 | 200 |
| Tragacanth | 10 | |
| Lactose | 247.5 | 300 |
| Corn starch | 25 | |
| Talcum | 15 | |
| Magnesium stearate | 2.5 | |
| Total | 500 | 500 |

In a similar manner tablets and capsules can be prepared using (a) 2-methoxy-3-(o-tolyl)-quinazoline-4(3H)-one,
(b) 2-propoxy-3-(o-tolyl)-quinazoline-4(3H)-one,
(c) 2-ethoxy-3-(4-methoxy-o-tolyl)-quinazoline-4(3H)-one,
(d) 2-ethoxy-3-(4-chloro-o-tolyl)-quinazoline-4(3H)-one,
(e) 2-(2-hydroxyethoxy)-3-(o-tolyl)-quinazoline-4(3H)-one or
(f) 2-(2-dimethylaminoethoxy)-2-(o-tolyl)-quinazoline-4(3H)-one as the active ingredient in place of the 2-ethoxy-3-(o-tolyl)-quinazoline-4(3H)-one above.

EXAMPLES 7 AND 8

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of tension. The injectable suspension is suitable for administration once or twice a day whereas the oral liquid suspension is suitably administered 2 to 4 times per day for this purpose.

| Ingredient: | Weight (mg.) | |
|---|---|---|
| | Sterile injectable suspension | Oral liquid suspension |
| 2-ethoxy-3-(o-tolyl)-quinazoline-4(3H)-one | 200 | 200 |
| Sodium carboxymethylcellulose, U.S.P. | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | q.s. |
| Color | | q.s. |
| Methyl paraben, U.S.P. | | 4.5 |
| Propyl paraben, U.S.P. | | 1.0 |
| Polysorbate 80 (e.g. Tween 80), USP | | 5 |
| Sorbitol solution 70%, USP | | 2,500 |
| Buffer agent to adjust pH for desired stability | q.s. | q.s. |
| Water | (1) | (2) |

1 For injection, q.s. to 1 ml.
2 Q.s. to 5 ml.

Similarly, sterile injectable suspension and oral liquid suspensions may be prepared using any of compounds (a) to (f) listed at the end of Examples 5 and 6 as the active ingredient in place of the 2-ethoxy-3-(o-tolyl)-quinazoline-4(3H)-one above.

What is claimed is:

1. A method of treating insomnia which comprises administering to a mammal in need of said treatment a sedative hypnotic effective amount of a compound of the formula:

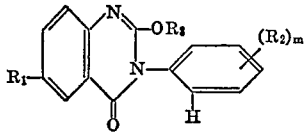

where $m$ is 1 or 2;

$R_1$ represents hydrogen or halo having an atomic weight of about 19 to 36;

each $R_2$ independently represents halo having an atomic weight of about 19 to 36, straight chain lower alkyl having 1 to 4 carbon atoms or straight chain lower alkoxy having 1 to 4 carbon atoms; and $R_3$ represents straight chain lower alkyl having 1 to 4 carbon atoms, —$(CH_2)_n$—$CH_2OR_4$ or

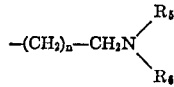

where $n$ is 1, 2 or 3;

$R_4$ represents hydrogen or lower alkyl having 1 or 2 carbon atoms; and $R_5$ and $R_6$ independently represent lower alkyl having 1 to 3 carbon atoms, or a pharmaceutically acceptable acid addition salt of the compound wherein $R_1$ is said

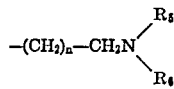

2. A method according to claim 1 wherein $R_2$ or, when $m$ is 2, one of the $R_2$ is ortho-methyl.

3. A method according to claim 1 wherein the compound is administered at a daily dosage of from about 150 milligrams to about 750 milligrams.

4. A method according to claim 1 wherein the compound is administered in a unit dosage form comprising said compound to the extent of from about 37.5 milligrams to about 375 milligrams per unit dosage.

5. A method according to claim 1 in which the compound is 2-ethoxy-3-(o-tolyl)-quinazoline-4(3H)-one.

References Cited

Bhavgava et al., Current Sci. 36, 575–6 (1967).
Lakhan, Chem. Pharm. Bull., 1969, 17(11), 2357–9.

JEROME D. GOLDBERG, Primary Examiner